US012701141B2

(12) United States Patent
    Lunati

(10) Patent No.: US 12,701,141 B2
(45) Date of Patent: Aug. 4, 2026

(54) ENABLING COMMUNICATIONS BETWEEN APPLICATIONS IN A MOBILE OPERATING SYSTEM

(71) Applicant: Capital One Services, LLC, McLean, VA (US)

(72) Inventor: Stephane Lunati, Cupertino, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/774,039

(22) Filed: Jul. 16, 2024

(65) Prior Publication Data

US 2024/0396940 A1    Nov. 28, 2024

Related U.S. Application Data

(63) Continuation of application No. 18/138,829, filed on Apr. 25, 2023, now Pat. No. 12,074,909, which is a
(Continued)

(51) Int. Cl.
    *H04L 9/40*        (2022.01)
    *H04L 67/02*       (2022.01)
(52) U.S. Cl.
    CPC .......... *H04L 63/18* (2013.01); *H04L 63/0236* (2013.01); *H04L 63/0823* (2013.01);
    (Continued)
(58) Field of Classification Search
    CPC . H04L 63/18; H04L 63/0236; H04L 63/0823; H04L 63/0853; H04L 63/0884;
    (Continued)

(56) References Cited

U.S. PATENT DOCUMENTS

| | | | |
|---|---|---|---|
| 5,590,038 | A | 12/1996 | Pitroda |
| 5,666,415 | A | 9/1997 | Kaufman |

(Continued)

FOREIGN PATENT DOCUMENTS

| | | |
|---|---|---|
| CN | 101192295 A | 6/2008 |
| CN | 105187477 A | 12/2015 |

(Continued)

OTHER PUBLICATIONS

T. Berners-Lee, "Uniform Resource Identifier (URI): Generic Syntax", Network Working Group, RFC3986, https://datatracker.ietf.org/doc/html/rfc3986, Jan. 31, 2005 (Jan. 31, 2005).
(Continued)

*Primary Examiner* — Sangseok Park
(74) *Attorney, Agent, or Firm* — KDW FIRM PLLC

(57)    ABSTRACT

Systems, methods, and computer-readable media for communications between applications in a mobile operating system. A first application may receive a request for data from a second application. The first application may generate a first URL to the second application, a parameter of the first URL comprising an identifier of the first application. A mobile operating system may access the first URL to open the second application. The second application may validate credentials for an account and initiate a server on a port. The second application may generate a second URL to the first application, a parameter of the second URL comprising the port. The operating system may access the second URL to open the first application. The first application may establish a connection with the server using the port specified in the second URL and receive data from the second application via the connection with the server.

20 Claims, 15 Drawing Sheets

100 ─

Related U.S. Application Data continuation of application No. 17/343,884, filed on Jun. 10, 2021, now Pat. No. 11,671,454, which is a continuation of application No. 16/876,549, filed on May 18, 2020, now Pat. No. 11,063,979.

(52) U.S. Cl.
CPC ...... *H04L 63/0853* (2013.01); *H04L 63/0884* (2013.01); *H04L 67/02* (2013.01)

(58) Field of Classification Search
CPC ..... H04L 67/02; G06F 9/547; G06F 16/9558; G06F 21/6281; G06F 21/606; H04W 12/37

See application file for complete search history.

(56) References Cited

U.S. PATENT DOCUMENTS

| | | | |
|---|---|---|---|
| 6,199,114 B1 | 3/2001 | White |
| 6,324,271 B1 | 11/2001 | Sawyer |
| 6,367,011 B1 | 4/2002 | Lee |
| 6,572,015 B1 | 6/2003 | Norton |
| 7,252,242 B2 | 8/2007 | Ho |
| 7,270,276 B2 | 9/2007 | Vayssiere |
| 7,287,692 B1 | 10/2007 | Patel |
| 7,374,099 B2 | 5/2008 | de Jong |
| 7,527,208 B2 | 5/2009 | Hammad |
| 7,568,631 B2 | 8/2009 | Gibbs |
| 7,584,153 B2 | 9/2009 | Brown |
| 7,628,322 B2 | 12/2009 | Holtmanns |
| 7,793,851 B2 | 9/2010 | Mullen |
| 7,801,799 B1 | 9/2010 | Brake, Jr. |
| 7,908,216 B1 | 3/2011 | Davis |
| 7,922,082 B2 | 4/2011 | Muscato |
| 8,010,405 B1 | 8/2011 | Bortolin |
| 8,074,877 B2 | 12/2011 | Mullen |
| 8,082,450 B2 | 12/2011 | Frey |
| 8,108,687 B2 | 1/2012 | Ellis |
| 8,186,602 B2 | 5/2012 | Itay |
| 8,196,131 B1 | 6/2012 | Von Behren |
| 8,249,654 B1 | 8/2012 | Zhu |
| 8,276,814 B1 | 10/2012 | Davis |
| 8,332,272 B2 | 12/2012 | Fisher |
| 8,346,670 B2 | 1/2013 | Hasson |
| 8,511,547 B2 | 8/2013 | Rans |
| 8,519,822 B2 | 8/2013 | Riegebauer |
| 8,750,514 B2 | 6/2014 | Gallo |
| 8,870,081 B2 | 10/2014 | Olson |
| 9,038,893 B2 | 5/2015 | Kirkham |
| 9,129,199 B2 | 9/2015 | Spodak |
| 9,183,490 B2 | 11/2015 | Moreton |
| 9,275,325 B2 | 3/2016 | Newcombe |
| 9,286,606 B2 | 3/2016 | Diamond |
| 9,306,753 B1 | 4/2016 | Vandervort |
| 9,501,776 B2 | 11/2016 | Martin |
| 9,710,744 B2 | 7/2017 | Wurmfeld |
| 9,949,065 B1 | 4/2018 | Zarakas |
| 9,965,632 B2 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |

| | | | |
|---|---|---|---|
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2003/0220876 A1 | 11/2003 | Burger |
| 2005/0156026 A1 | 7/2005 | Ghosh |
| 2005/0228997 A1 | 10/2005 | Bicker |
| 2005/0269402 A1 | 12/2005 | Spitzer |
| 2007/0276765 A1 | 11/2007 | Hazel |
| 2008/0082452 A1 | 4/2008 | Wankmueller |
| 2008/0099552 A1 | 5/2008 | Grillion |
| 2009/0143104 A1 | 6/2009 | Loh |
| 2009/0235339 A1 | 9/2009 | Mennes |
| 2009/0282264 A1 | 11/2009 | Amiel |
| 2011/0113245 A1 | 5/2011 | Varadarajan |
| 2011/0155801 A1 | 6/2011 | Rowberry |
| 2012/0143703 A1 | 6/2012 | Wall |
| 2013/0013499 A1* | 1/2013 | Kalgi ................... G06Q 20/386 |
| | | 705/41 |
| 2013/0030997 A1 | 1/2013 | Spodak |
| 2013/0146657 A1 | 6/2013 | Graef |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0259028 A1 | 9/2014 | Atwood et al. |
| 2014/0317637 A1 | 10/2014 | Gadotti |
| 2014/0365377 A1 | 12/2014 | Salama |
| 2015/0032635 A1 | 1/2015 | Guise |
| 2015/0040145 A1 | 2/2015 | Partridge et al. |
| 2015/0073983 A1 | 3/2015 | Bartenstein |
| 2015/0113271 A1 | 4/2015 | Jooste |
| 2015/0134513 A1 | 5/2015 | Olson |
| 2015/0199673 A1 | 7/2015 | Savolainen |
| 2015/0199863 A1 | 7/2015 | Scoggins |
| 2015/0254637 A1 | 9/2015 | Yang |
| 2015/0317295 A1 | 11/2015 | Sherry |
| 2015/0334105 A1* | 11/2015 | Kessler ................... H04L 67/10 |
| | | 709/208 |

(56)　　　References Cited

U.S. PATENT DOCUMENTS

| | | | |
|---|---|---|---|
| 2015/0334108 A1* | 11/2015 | Khalil | H04W 12/06 |
| | | | 726/8 |
| 2016/0078430 A1 | 3/2016 | Douglas | |
| 2016/0189143 A1 | 6/2016 | Koeppel | |
| 2016/0253651 A1 | 9/2016 | Park | |
| 2016/0277383 A1 | 9/2016 | Guyomarc'h | |
| 2016/0307189 A1 | 10/2016 | Zarakas | |
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0324561 A1* | 11/2017 | Shekh-Yusef | H04L 9/30 |
| 2017/0330173 A1 | 11/2017 | Woo | |
| 2018/0039987 A1 | 2/2018 | Molino | |
| 2018/0124051 A1* | 5/2018 | Wang | H04L 63/0281 |
| 2018/0268132 A1 | 9/2018 | Buer | |
| 2018/0300716 A1 | 10/2018 | Carlson | |
| 2019/0172055 A1 | 6/2019 | Hale | |
| 2019/0173877 A1* | 6/2019 | Yamanakajima | H04L 63/0807 |
| 2019/0303945 A1 | 10/2019 | Mitra | |
| 2020/0059477 A1* | 2/2020 | Sundar | H04L 63/083 |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | |
|---|---|---|
| CN | 106980552 A | 7/2017 |
| CN | 107636664 A | 1/2018 |
| CN | 108933838 A | 12/2018 |
| GB | 2516861 A | 2/2015 |
| GB | 2551907 A | 1/2018 |
| JP | 2009253444 A | 10/2009 |
| JP | 2019125179 A | 7/2019 |
| JP | 2019530089 A | 10/2019 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "EMV Integrated Circuit Card Specifcations for Payment Systems, Book 2, Security and Key Management," Version 3.4, [online] 2011 [retrieved on 2019 -03-25]. Retrieved from Internet URL: https://www.emvco. com/wp-content/uploads/2017/05/EMV_v4.3_Book_2_Security_and_Key_Management_20120607061923900.pdf, 174 pages.

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on 2019-03-25]. Retrieved from Internet URL: https://support.apple.com/guide/safari/use-autofill- ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive. org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

URL 126 Launched by OS to Open Other Application 114-1, Local Server 115 Registered as Background Task Data Transfer Occurs Using Connection Between Local Server 115 and Other Application 114-1

ENABLING COMMUNICATIONS BETWEEN APPLICATIONS IN A MOBILE OPERATING SYSTEM

RELATED APPLICATIONS

This application is a continuation of U.S. patent application Ser. No. 18/138,829, filed on Apr. 25, 2023, which is a continuation of U.S. patent application Ser. No. 17/343,884 (now U.S. Pat. No. 11,671,454), filed on Jun. 10, 2021, which is a continuation of U.S. patent application Ser. No. 16/876,549 (now U.S. Pat. No. 11,063,979), titled "ENABLING COMMUNICATIONS BETWEEN APPLICATIONS IN A MOBILE OPERATING SYSTEM" filed on May 18, 2020. The contents of the aforementioned application are incorporated herein by reference.

TECHNICAL FIELD

Embodiments herein generally relate to computing platforms, and more specifically, to enabling communications between applications in a mobile operating system.

BACKGROUND

Some mobile operating systems place restrictions on communications between two or more applications executing on the same device. For example, some mobile operating systems may prevent a first application from directly communicating with a second application. Similarly, some mobile operating systems may restrict the exchange of data between such applications. Doing so may unnecessarily restrict legitimate and secure communication between applications.

SUMMARY

Embodiments disclosed herein provide systems, methods, articles of manufacture, and computer-readable media for communications between applications in a mobile operating system. In one example, a first application executing on a processor of a device may receive a request for data from a second application on the device. The first application may generate a first URL directed to the second application. A parameter of the first URL may comprise an identifier of the first application. A mobile operating system executing on the device may access the first URL to open the second application. The second application may validate credentials for an account and initiate a server on a port for execution on the device. The second application may generate a second URL directed to the first application, a parameter of the second URL comprising the port. The operating system may access the second URL to open the first application. The first application may establish a connection with the server using the port specified in the second URL and receive data from the second application via the connection with the server.

DETAILED DESCRIPTION

Figure 1A:
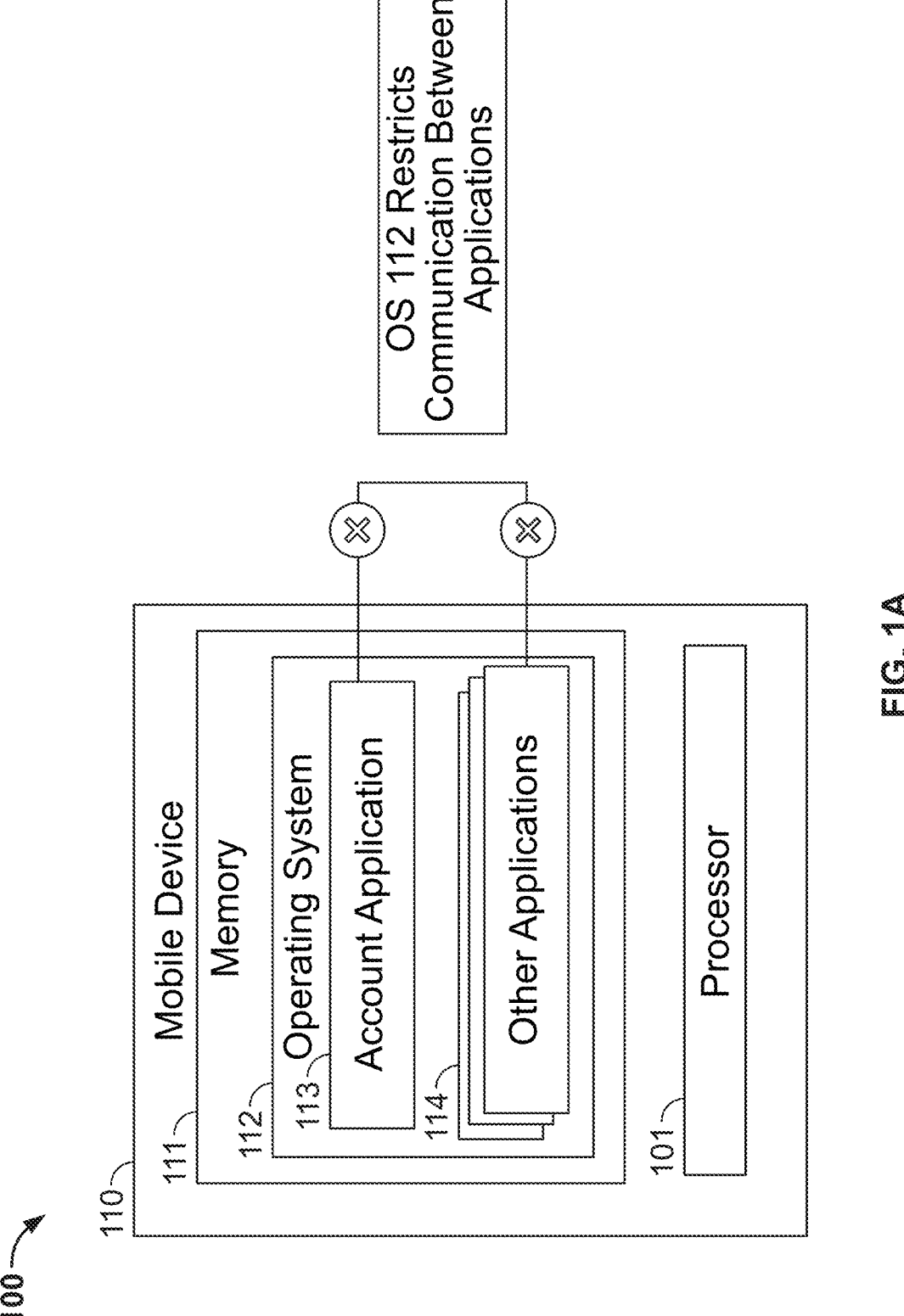
FIGS. 1A-1F illustrate embodiments of a system for enabling communications between applications in a mobile operating system.

Embodiments disclosed herein provide techniques for secure communications between two or more applications in a mobile operating system (OS) that restricts communications between applications registered to different developers. Generally, a first application executing on a device may benefit from data that may be provided by a second application on the device. For example, the first application may be a merchant application registered with the merchant in the OS, and the second application may be an application provided by a financial institution that is registered with the financial institution in the OS. In such an example, a user of the merchant application may request to use data from the financial institution application, e.g., payment information, biographical information, etc., in the merchant application. Responsive to the request, the merchant application may generate a first uniform resource locator (URL) that is directed to the financial institution application. A parameter of the first URL may include an identifier of the merchant application.

The merchant application may then instruct the mobile OS to open or otherwise access the first URL. Doing so causes the mobile OS to open the financial institution application on the device. The financial institution application may then initiate a local server in the OS that is only accessible to applications executing on the mobile device. The local server may be initiated on a port and may be a transmission control protocol/internet protocol (TCP/IP) server or any other type of server (e.g., a hypertext transfer protocol (HTTP) server). In some embodiments, the financial institution application may receive authentication credentials for an account with the financial institution prior to initiating the server. Additionally and/or alternatively, prior to initiating the server, the financial institution application may receive encrypted data from a contactless card associated with the account, transmit the encrypted data to an authentication server, and receive confirmation from the authentication server that the encrypted data was verified.

The financial institution application may generate a second URL that is directed to the merchant application. The second URL may be based at least in part on the identifier of the merchant application specified as a parameter of the first URL. The second URL may further specify the port of the local server as a parameter. The financial institution application may further register the local server and/or the financial institution application as a background task with the OS, such that the local server and/or the financial institution application continues to execute in the background of the OS as other applications execute in the foreground of the OS (e.g., the merchant application). The financial institution application may instruct the mobile OS to open or otherwise access the second URL. Doing so causes the OS to open the merchant application in the foreground of the OS.

Once opened, the merchant application may identify the port of the local server specified in the second URL and establish a connection with the local server at the specified port on a local interface (e.g., a local loopback IP address). In some embodiments, the merchant application may provide a certificate that may be validated by the server as part of establishing the connection. Additionally and/or alternatively, the merchant application may provide a token that may be verified by the server as part of establishing the connection. Once a connection is established, the financial institution application may exchange data with the merchant application over the connection, and vice versa. For example, the financial institution application may provide account details for the authenticated account holder (e.g., payment card number, expiration date, card verification value (CVV), address information, etc.). In such an example, the merchant application may autofill the received data into a form, thereby allowing the user to complete a purchase or other operation using the received data. More generally any number and type of data may be exchanged via the connection.

Advantageously, the mobile OS may restrict access to the local server by external entities. Doing so improves the security of the device and any data. Furthermore, by securely receiving payment data from the financial institution application, the security of the payment data is enhanced. For example, a user need not manually enter the data, which could compromise the security of the data. Furthermore, in some embodiments, the financial institution may provide a framework (e.g., a software development kit (SDK)) that includes the required functionality to perform the operations disclosed herein. Doing so allows only the required functionality to be integrated into third party applications (e.g., the merchant application) without requiring a full SDK and/or framework that would otherwise be required to perform the operations disclosed herein. For example, by providing one or more APIs to the merchant application that can be used to exchange data, the SDK allows the merchant application to be of a reduced size relative to including the full code base of the financial institution application in the merchant application to provide the required functionality in the merchant application.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more mobile computing devices 110. The mobile devices 110 are representative of any type of network-enabled computing devices that execute mobile operating systems, such as smartphones, tablet computers, wearable devices, laptops, portable gaming devices, and the like. The mobile device 110 may include a processor 101 and a memory 111. The processor 101 may be any computer processor, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 101. The memory 111 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

As show, the memory 111 of the mobile device 110 includes an instance of a mobile operating system (OS) 112. Example mobile operating systems 112 include the Android® and iOS® mobile operating systems. As shown, the OS 112 includes an account application 113 and one or more other applications 114. The account application 113 allows users to perform various account-related operations, such as activating payment cards, viewing account balances, purchasing items, processing payments, and the like. In some embodiments, a user may authenticate using authentication credentials to access certain features of the account application 113. For example, the authentication credentials may include a username (or login) and password, biometric credentials (e.g., fingerprints, Face ID, etc.), and the like. The other applications 114 are representative of any type of computing application, such as web browsers, merchant applications, shopping applications, delivery service applications, ride-sharing applications, messaging applications, word processing applications, social media applications, and the like. For example, a first one of the other applications 114 may be a merchant application provided by a merchant to purchase goods, services, or any other type of item. As another example, a second one of the other applications 114 may be a ride-sharing application that allows users to arrange and pay for transportation services. As yet another example, a third one of the other applications 114 may be a delivery service application that allows users to purchase food for delivery.

Due to restrictions imposed by the OS 112, applications registered (or assigned) to different developers (or entities) may not be able to communicate and/or exchange data. For example, if such restrictions are in place, the account application 113 (registered with a financial institution as developer) cannot communicate and/or exchange data with the other applications 114 (registered with entities other than the financial institution). Similarly, a first one of the other applications 114 (registered with a first entity) cannot communicate with another one of the other applications 114 (registered with a second entity different than the first entity). The registration of applications may occur when applications are submitted to an application store associated with a provider of the OS 112. Advantageously, however, embodiments disclosed herein provide techniques to securely allow for communication and/or data exchange between applications registered with different developers (e.g., the account application 113 and any of the other applications 114, and/or any two of the other applications 114).

Figure 1B:
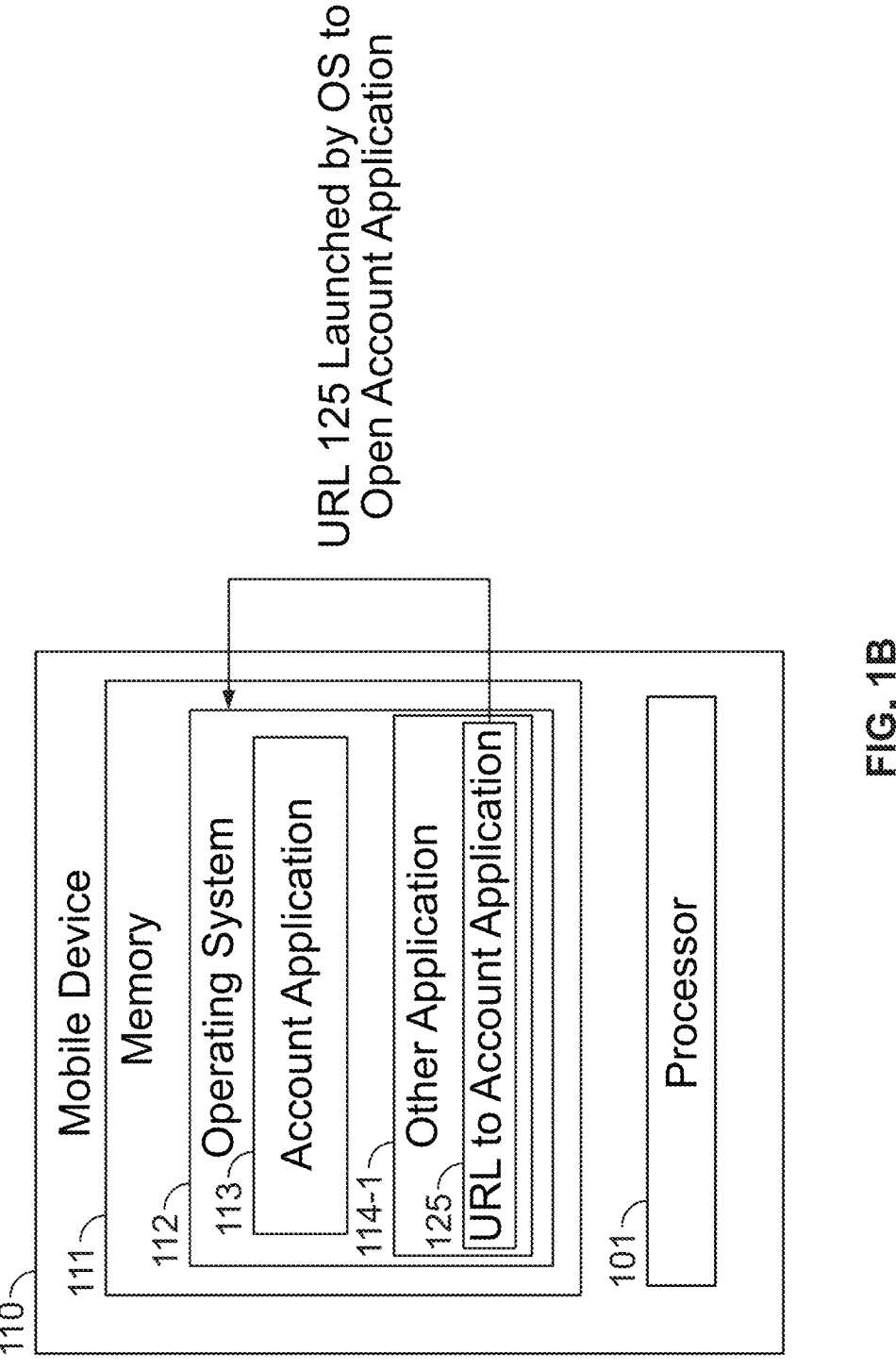

FIG. 1B illustrates an embodiment where an application 114-1 has received a request to communicate with the account application 113. For example, the application 114-1 may be an application registered (or assigned) to a merchant. In such an example, the user may select one or more items to purchase via the application 114-1. During the checkout process, the application 114-1 may give the user the option to provide payment and/or personal information using the account application 113. The user may then accept the option, thereby instructing the application 114-1 to communicate with the account application 113 to receive data. Responsive to the request, the application 114-1 may generate a URL 125. The URL 125 may be directed to the account application 113. The URL 125 may further include a parameter indicating the application 114-1 has generated the URL 125. The URL 125 may be a universal link, or any type of URL. The parameter may be any identifier suitable to uniquely identify the application 114-1, such as a unique identifier, token, or URL string. For example, the URL 125 may be "capitalone://?appid=merchantapp", where the "capitalone://" portion is directed to the instance of the account application 113 on the device 110, and the "appid=merchantapp" is an identifier of the application 114-1 generating the URL 125. In some embodiments, the parameter is encrypted by the application 114-1 and decrypted by the account application 113 upon receipt.

In some embodiments, the application 114-1 uses an application programming interface (API) of the OS 112 to determine whether the URL 125 is valid (e.g., indicates whether the application targeted by the URL 125 is installed on the device 110). For example, the OS 112 may provide a "canOpenURL" API that indicates whether a URL provided as input to the API is valid. Generally, application developers may register one or more URLs with the provider of the OS 112 when submitting the application to the application store. Doing so may facilitate the validations by the API provided by the OS. In such an example, the application 114-1 may provide the URL 125 (and/or the portion of the URL 125 directed to the account application 113) to the API, which indicates whether the account application 113 is installed on the device and can be opened using the URL 125. Doing so enhances security by ensuring the correct application is installed and by thwarting attempts by third parties that provide an application masquerading as the account application 113. In the latter instance, the masquerading attempt may be thwarted because the third party application would not be registered with the URL being provided as input to the API. In such an example, if the API returns an invalid response, accessing the URL 125 may cause the OS 112 to launch a web browser directed to a website associated with the entity registering the account application 113 (e.g., the website of the financial institution and/or an application store where the account application 113 may be downloaded).

Figure 1C:
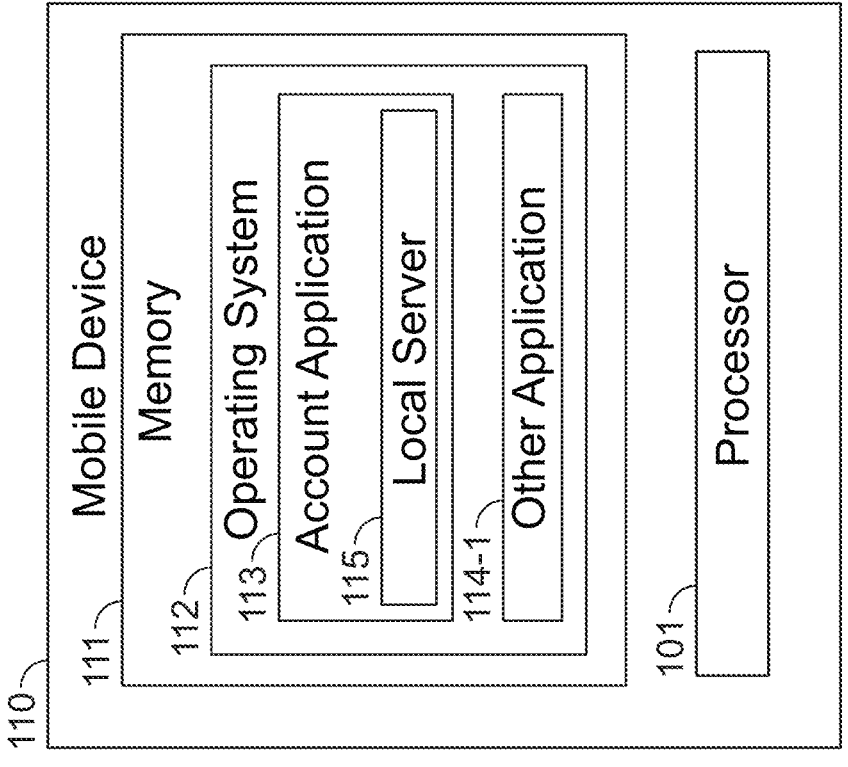

The application 114-1 and/or the OS 112 may then access, open, or otherwise follow the URL 125, thereby causing the account application 113 to open in the foreground of the OS 112. FIG. 1C depicts an embodiment where the account application 113 is opened responsive to accessing the URL 125. In response, the account application 113 may optionally receive authentication credentials for an account. In addition and/or alternatively (and as discussed in greater detail with reference to FIGS. 2A-2C), the account application 113 may optionally initiate verification of encrypted data generated by a contactless card. The account application 113 may then initiate a local server 115 to execute on the mobile device 110. The local server 115 may be any type of server, such as a TCP/IP server, HTTP server, Hypertext Transfer Protocol Secure (HTTPS) server, a streaming server, and the like. However, only local applications (e.g., applications executing on the mobile device 110) may access the local server 115. The OS 112 may restrict attempts to access the local server 115 from external sources (e.g., via a network). The account application 113 may initiate the local server 115 on a specific port number. The account application 113 may select the port according to any feasible selection scheme, such as randomly generating port numbers, using a predetermined port number, and the like.

Figure 1D:
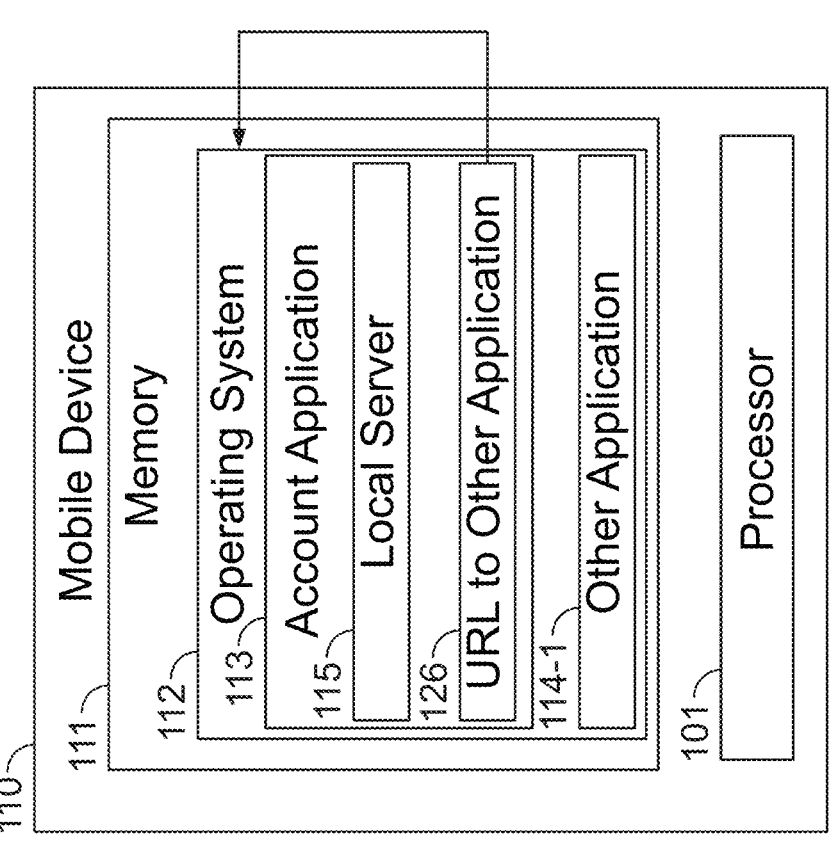

FIG. 1D depicts an embodiment where the account application 113 generates a URL 126. The URL 126 may be directed to the application 114-1 and may include the port number of the local server 115. For example, the URL 126 may be "merchantapp://?port=2080", where the "merchantapp://" portion is directed to the application 114-1 and the "port=2080" portion indicates the local server 115 is open on port 2080. The account application 113 determines the portion of the URL 126 directed to the application 114-1 based on the identifier of the application 114-1 specified in the URL 125. In some embodiments, similar to the URL 125, the account application 113 makes an API call to the OS 112 to determine whether the URL 126 is valid prior to accessing the URL 126.

More generally, the URL 126 may comprise any parameters sufficient to establish a connection to the local server 115 at the selected port. In some embodiments, the account application 113 may encrypt the port number or any additional parameters of the URL 126, e.g., using an encryption key, or a public key. In such embodiments, the application 114-1 may decrypt the port number and/or additional parameters, e.g., using a corresponding decryption key, e.g., a private key. Furthermore, any URL parameters exchanged between any applications may be encrypted to enhance security.

Furthermore, the account application 113 may register the local server 115 and/or the account application 113 as a background task with the OS 112. Doing so allows the local server 115 and/or the account application 113 to continue executing in the background of the OS 112 while other applications execute in the foreground of the OS 112. Although the local server 115 has been initiated, in some embodiments, the account application 113 may initiate the local server 115 after generating the URL 126.

Figure 1E:
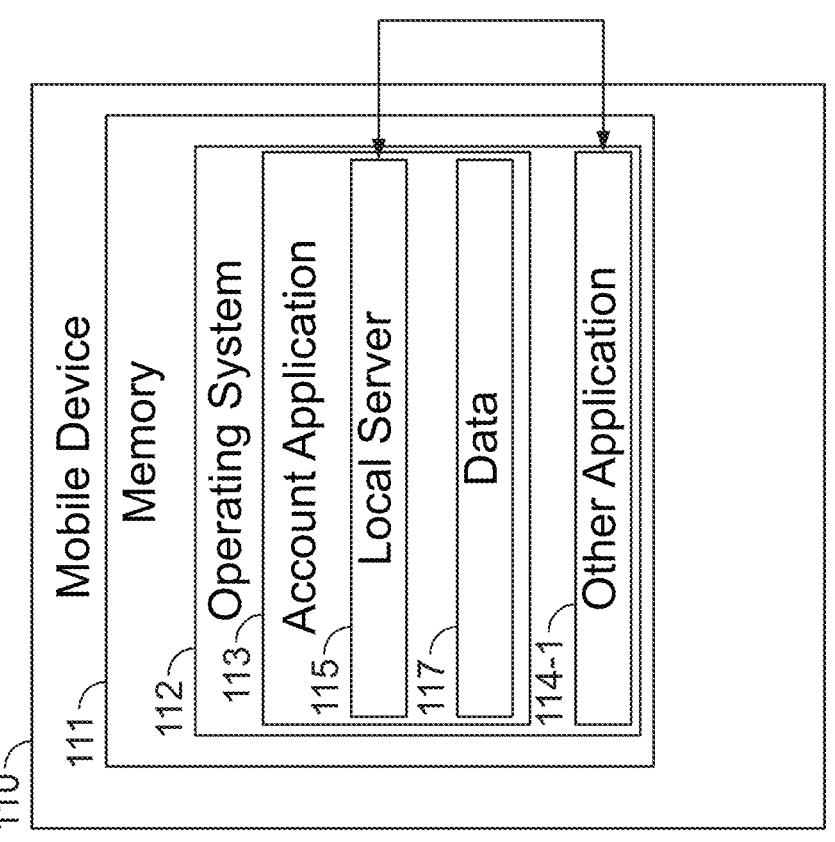

FIG. 1E illustrates an embodiment where the account application 113 and/or the OS 112 has opened the URL 126 to open the application 114-1 while the local server 115 and/or the account application 113 continue to execute in the background of the OS 112. Responsive to receiving the URL 126, the application 114-1 may identify the port number of the local server 115 specified as a parameter of the URL 126. The application 114-1 may then request to establish a connection with the local server 115 at the specified port, e.g., on a local loopback IP address (e.g., 127.0.0.1 for IPV4, ::1 for IPV6, etc.), the "localhost" hostname, or other predefined local IP address. The connection may be established using the protocols supported by the local server 115 (e.g., TCP/IP connection establishment, etc.). As stated, if the URL 126 includes encrypted data, the application 114-1 may decrypt the encrypted port number (or any other relevant parameters) in the URL 126. In some embodiments, the application 114-1 provides a token and/or digital certificate (or signature) as part of the connection request to the local server 115-1. The local server 115 may determine whether the token is valid and/or expected (e.g., the token identifies the application 114-1, which may match the token received as a parameter of the URL 125). Similarly, the local server 115 may validate the certificate using a public key associated with the application 114-1. If the token and/or certificate are validated, the local server 115 may establish the connection with the application 114-1. Otherwise, the local server 115 may reject the connection request.

FIG. 1E illustrates an embodiment where a connection between the application 114-1 and the local server 115 has been established (and the local server 115 continues to execute as a background task in the OS 112). As shown, the account application 113 may include data 117. The data 117 may be any type of data. For example, the data 117 may include a payment card number (which may be a virtual account number), expiration date, CVV, address, first name, last name, or any other attribute of the account with the account application 113. Advantageously, the local server 115 may provide the data 117 to the application 114-1 while the local server 115 executes in the background of the OS 112 and the application 114-1 executes in the foreground of the OS 112.

Figure 1F:
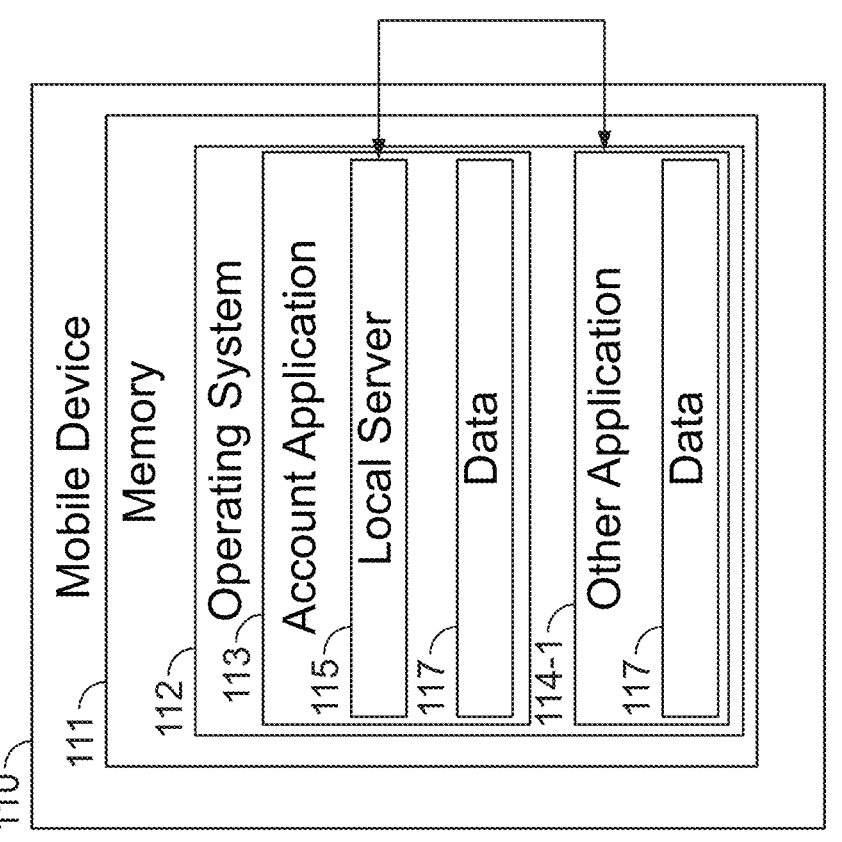

FIG. 1F illustrates an embodiment where the application 114-1 has received the data 117 from the local server 115. The application 114-1 may identify the data 117 and determine that the data 117 includes one or more attributes of the user and/or the associated account. The application 114-1 may then autofill the data 117 into one or more form fields, allowing the user to complete the checkout using data that has been securely received from the local server 115. As stated, doing so allows the data 117 to securely be transferred between applications on the same device 110. Furthermore, by requiring only a minimal set of requirements (e.g., APIs, a minimal SDK, etc.), the application 114-1 is able to receive any amount of data from the local server 115. Otherwise, the size of the application 114-1 would be much larger to support the disclosed functionality. Further still, embodiments disclosed herein allow the applications 114-1 and 113 to exchange data even though the applications are registered with different developers.

Figure 2A:
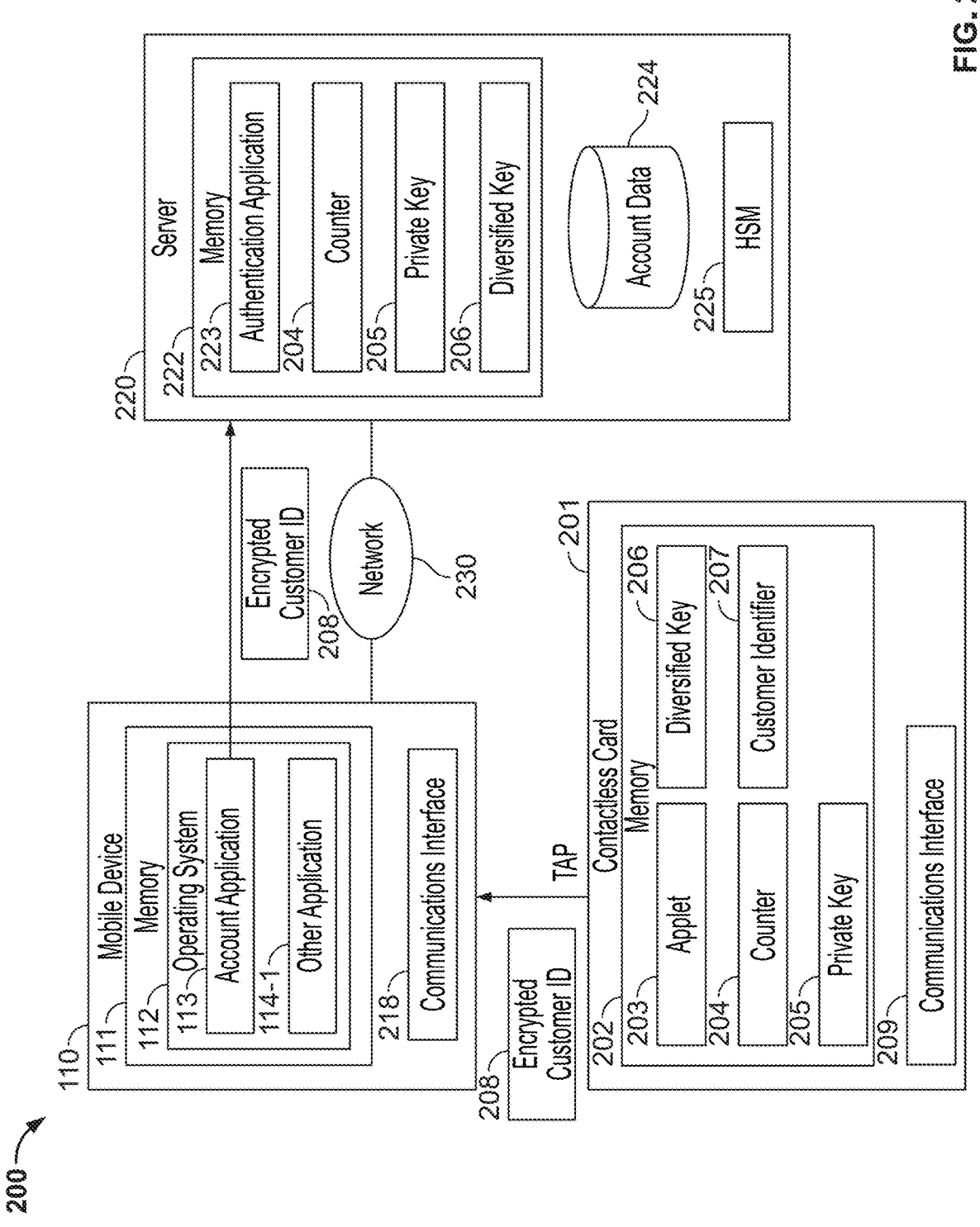
FIGS. 2A-2C illustrate embodiments of a system for enabling communications between applications in a mobile operating system.

FIG. 2A depicts a schematic of an exemplary system 200, consistent with disclosed embodiments. As shown, the system 200 includes one or more contactless cards 201, one or more of the mobile computing devices 110, and an authentication server 220. The contactless cards 201 are representative of any type of payment cards, such as a credit card, debit card, ATM card, gift card, and the like. The contactless cards 201 may comprise one or more communications interfaces 209, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of communications, such as the EMV standard, Bluetooth, and/or Wi-Fi. The authentication server 220 is representative of any type of computing device, such as a server, workstation, compute cluster, cloud computing platform, virtualized computing system, and the like.

As shown, a memory 202 of the contactless card includes an applet 203, a counter 204, a private key 205, a diversified key 206, and a unique customer identifier (ID) 207. The applet 203 is executable code configured to perform the operations described herein. The counter 204, private key 205, diversified key 206, and customer ID 207 are used to provide security in the system 200 as described in greater detail below.

As stated, the contactless cards 201 may be used to enhance the security of the local server 115 and the mobile device 110. For example, the user of device 110 may desire to use data from the account application 113 in the application 114-1. Therefore, FIG. 2A depicts an embodiment where the account application 114-1 has generated and accessed the URL 125 directed to the account application 113. The OS 112 may then open the account application 113, which may receive authentication credentials for the user's account. The account application 113 may then instruct the user to tap the contactless card 201 to the device 110. Generally, once the contactless card 201 is brought within communications range of the communications interface 218 (e.g., a card reader/writer) of the device 110, the applet 203 of the contactless card 201 may generate encrypted data as part of the authentication process required to activate the contactless card 201. To enable NFC data transfer between the contactless card 201 and the mobile device 110, the account application 113 may communicate with the contactless card 201 when the contactless card 201 is sufficiently close to the communications interface 218 of the mobile device 110. The communications interface 218 may be configured to read from and/or communicate with the communications interface 209 of the contactless card 201 (e.g., via NFC, Bluetooth, RFID, etc.). Therefore, example communications interfaces 218 include NFC communication modules, Bluetooth communication modules, and/or RFID communication modules.

As stated, the system 100 is configured to implement key diversification to secure data, which may be referred to as a key diversification technique herein. Generally, the server 220 (or another computing device) and the contactless card 201 may be provisioned with the same private key 205 (also referred to as a master key, or master symmetric key). More specifically, each contactless card 201 is programmed with a unique private key 205 that has a corresponding pair in (or managed by) the server 220. For example, when a contactless card 201 is manufactured, a unique private key 205 may be stored in the memory 202 of the contactless card 201. Similarly, the unique private key 205 may be stored in a record (or profile) of a customer associated with the contactless card 201 in the account data 224 of the server 220 (and/or stored in a different secure location, such as the hardware security module (HSM) 225). The private key 205 may be kept secret from all parties other than the contactless card 201 and server 220, thereby enhancing security of the system 100. In some embodiments, the applet 203 of the contactless card 201 may encrypt and/or decrypt data (e.g., the customer ID 207) using the private key 205 and the data as input a cryptographic algorithm. For example, encrypting the customer ID 207 with the private key 205 may result in an encrypted customer ID. Similarly, the authentication server 220 may encrypt and/or decrypt data associated with the contactless card 201 using the corresponding private key 205.

In some embodiments, the counters 204 and/or private keys 205 of the contactless card 201 and server 220 may be used in conjunction with the counters 204 to enhance security using key diversification. The counters 204 comprise values that are synchronized between a given contactless card 201 and server 220. The counter value 204 may comprise a number that changes each time data is exchanged between the contactless card 201 and the server 220 (and/or the contactless card 201 and the mobile device 110). When preparing to send data (e.g., to the server 220 and/or the mobile device 110), the applet 203 of the contactless card 201 may increment the counter value 204. The contactless card 201 may then provide the private key 205 and counter value 204 as input to a cryptographic algorithm, which produces a diversified key 206 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 201 may then encrypt the data (e.g., the customer ID 207 and/or any other data) using the diversified key 206 and the data as input to the cryptographic algorithm. For example, encrypting the customer ID 207 with the diversified key 206 may result in an encrypted customer ID 208. Once generated, the applet 203 may transmit the encrypted customer ID 208 to the mobile device 110, e.g., via NFC. The account application 113 may then transmit the encrypted customer ID 208 to the authentication server 220 via the network 230.

The authentication application 223 may then attempt to authenticate the encrypted data. For example, the authentication application 223 may attempt to decrypt the encrypted customer ID 208 using a copy of the private key 205 stored by the server 220. In another example, the authentication application 223 may provide the private key 205 and counter value 204 as input to the cryptographic algorithm, which produces a diversified key 206 as output. The resulting diversified key 206 may correspond to the diversified key 206 of the contactless card 201, which may be used to decrypt the encrypted customer ID 208. Therefore, the authentication application 223 may successfully decrypt the encrypted data, thereby verifying the encrypted customer ID 208. For example, as stated, a customer ID 207 may be used to generate the encrypted customer ID 208. In such an example, the authentication application 223 may decrypt the encrypted customer ID 208 using the private key 205 of the authentication server 220. If the result of the decryption yields the customer ID 207 associated with the account in the account data 224, the authentication application 223 verifies the encrypted customer ID 208. If the authentication application 223 is unable to decrypt the encrypted customer ID 208 to yield the expected result (e.g., the customer ID 207 of the account associated with the contactless card 201), the authentication application 223 does not validate the encrypted customer ID 208. Due to the failed verification, the authentication application 223 may return an error to the account application 113, which may refrain from initiating the local server 115.

Regardless of the decryption technique used, the authentication application 223 may successfully decrypt the encrypted customer ID 208, thereby verifying the encrypted customer ID 207 (e.g., by comparing the resulting customer ID 208 to a customer ID stored in the account data 224, and/or based on an indication that the decryption using the key 205 and/or 206 was successful). Although the keys 205, 206 are depicted as being stored in the memory 222, the keys 205, 206 may be stored elsewhere, such as in a secure element and/or the HSM 225. In such embodiments, the secure element and/or the HSM 225 may decrypt the encrypted customer ID 207 using the keys 205 and/or 206 and a cryptographic function. Similarly, the secure element and/or HSM 225 may generate the diversified key 206 based on the private key 205 and counter value 204 as described above.

Figure 2B:
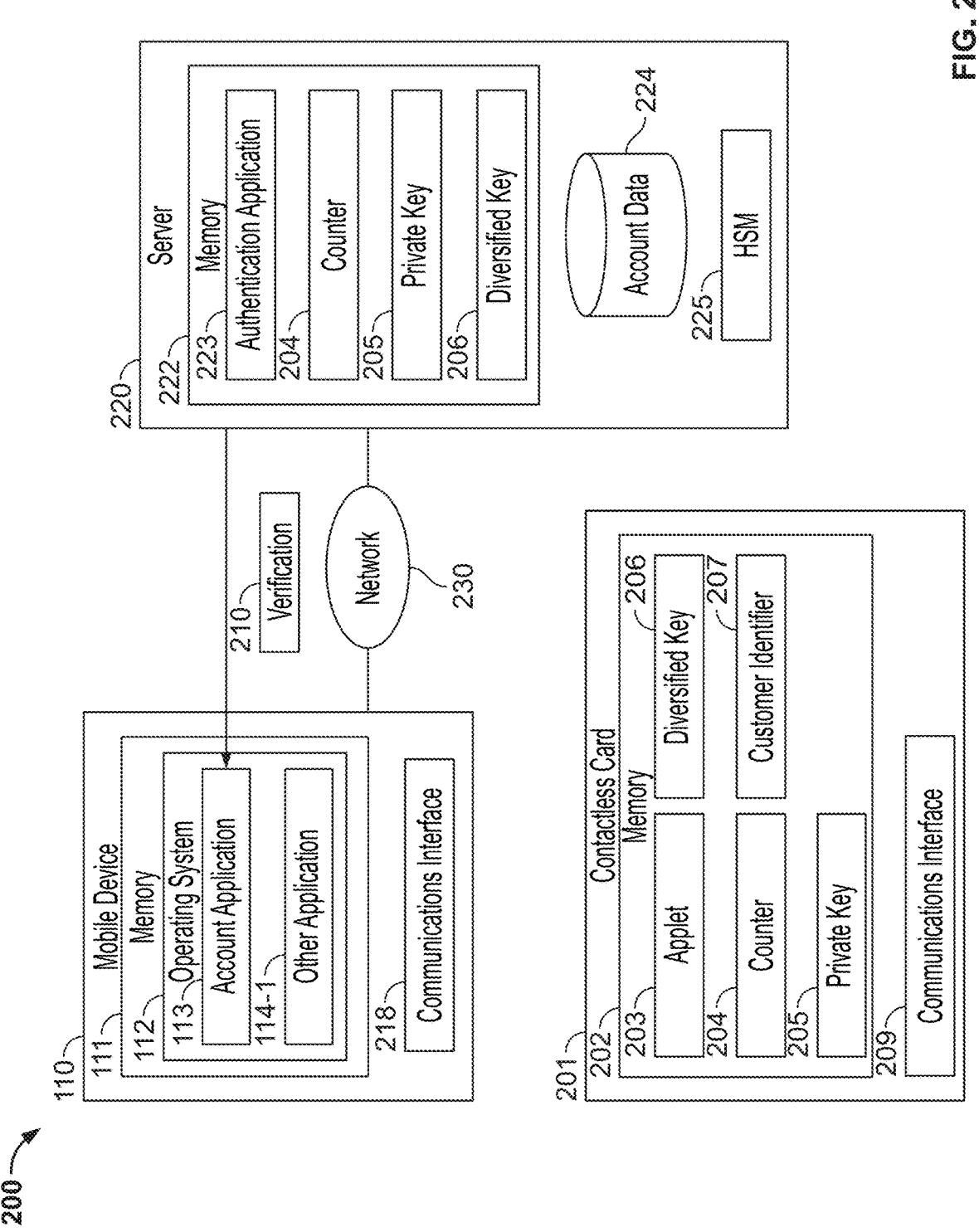
Figure 2C:
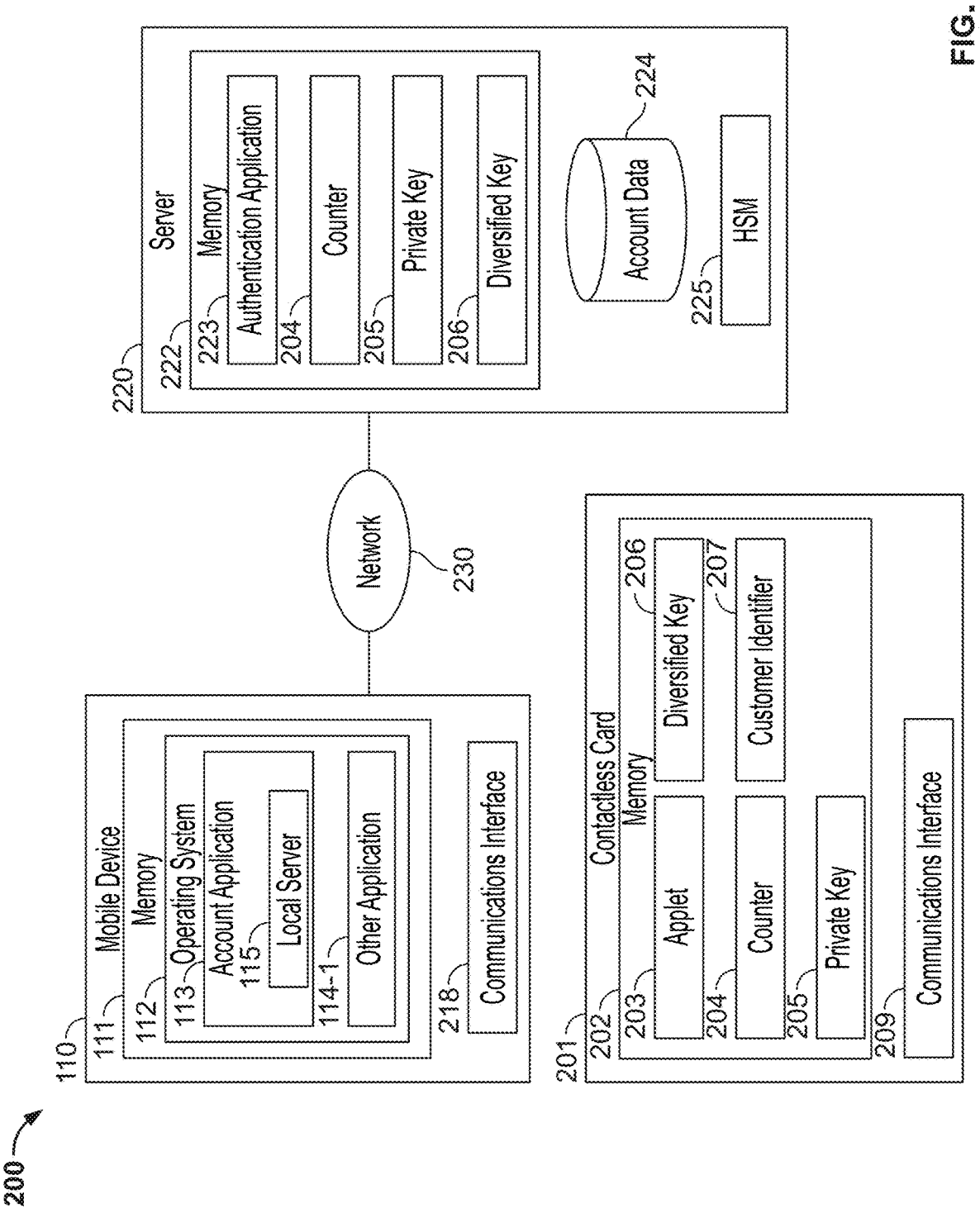

FIG. 2B depicts an embodiment where authentication application 223 verifies the encrypted customer ID 208. As shown, the authentication application 223 may return an indication of verification 210 to the account application 113. Based on the verification 210 and/or receipt of authentication credentials for the account, the account application 113 may determine to initiate the local server 115. FIG. 2C depicts an embodiment where the account application 113 has initiated the local server 115 on the device 110. The account application 113 may then generate a URL including a port number of the local server 115, where the URL is directed to the requesting application 114-1. The URL will then open the requesting application 114-1, which allows the application 114-1 to establish a connection with the local server 115 executing in the background of the OS 112. The application 114-1 may then receive data from the account application 113 and/or the server 115.

Figures 3A, 3B:
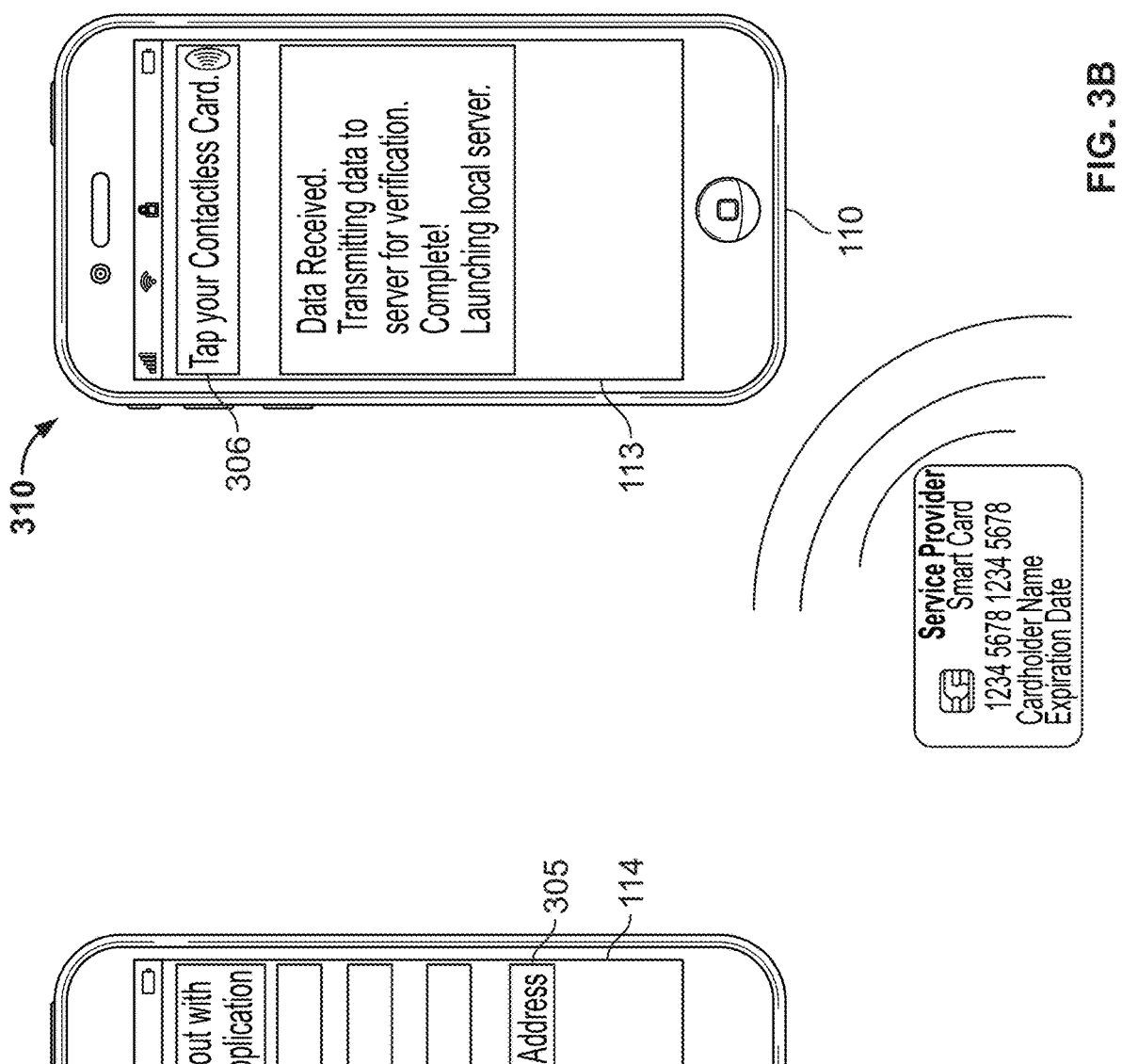
FIGS. 3A-3C illustrate embodiments of enabling communications between applications in a mobile operating system.

FIG. 3A is a schematic 300 depicting an example embodiment of enabling communication between applications in a mobile operating system. As shown, FIG. 3A includes a mobile device 110 executing an example application 114. For example, the application 114 may be an application that allows a user to place an order and provide payment information or the order. As shown, the graphical user interface (GUI) of the application 114 includes a payment form having fields 301-305, where field 301 a name field, field 302 is an account number field, field 303 is an expiration date field, field 304 is a CVV field, and field 305 is an address field. As shown, the application 114 may output a notification 309 specifying to select the notification 309 to complete the checkout using data from another application, e.g., the account application 113.

FIG. 3B is a schematic 310 illustrating an embodiment where the user has selected the notification 309. Doing so may cause the application 114 to generate a URL 125 to the account application 113, where the URL 125 includes an identifier of the application 114 as a parameter. Once opened, the URL 125 causes the account application 113 to be opened in the foreground of the OS 112. As shown in FIG. 3B, the account application 113 may output a notification 306 specifying to tap the contactless card 201 to the mobile device 110 to proceed with the authentication. As stated, the account application 113 may instruct the user to provide authentication credentials (not depicted) prior to and/or subsequent to the tap of the card 201. Once the contactless card 201 is tapped to the mobile device 110, the account application 113 transmits, via the communications interface 218, an indication to the contactless card 201 to generate encrypted data as described above (e.g., the encrypted customer ID 208), and transmit the encrypted data to the account application 113. Once received, the account application 113 may then transmit the encrypted data to the server 220, where the authentication application 223 verifies the encrypted data using key diversification as described above. The authentication application 223 may then transmit an indication of the verification to the account application 113. Furthermore, the authentication application 223 may transmit any type of data to the account application 113 based on the verification of the encrypted data, such as account holder name, billing address, shipping address, etc., from the account data 224.

Once the account application 113 receives the indication specifying that the server 220 verified the encrypted data, the account application 113 may initiate the local server 115 on the device 110. The account application 113 may then generate a URL 126 directed to the requesting application 114, where a parameter of the URL 126 includes the port number of the local server 115. The application 114 may then connect to the local server 115 as described above, and request the relevant data, e.g., names, addresses, payment card information, expiration date, and CVV.

Figure 3C:
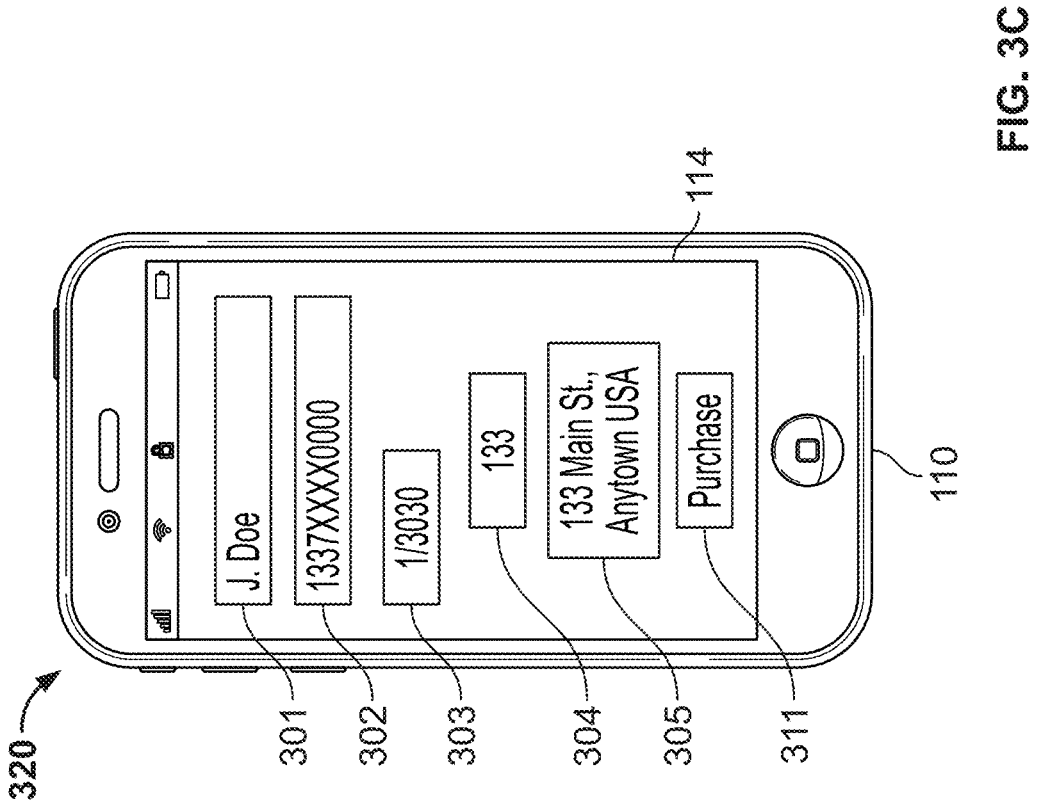

FIG. 3C is a schematic 320 depicting an embodiment where the application 114 has received the requested data from the local server 115. The application 114 may include an SDK or APIs that allow the application 114 to request and/or receive data as well as parse any received data. As shown, the application 114 may autofill the user's name to the name field 201, the account number to the account number field 302, the expiration date to the expiration date field 303, the CVV to the CVV field 304, and the address to the address field 305. The user may then complete the purchase using the button 311. Doing so may complete the purchase. Furthermore, the data filled in the fields 301-305 may be stored in a user profile associated with the application 114.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
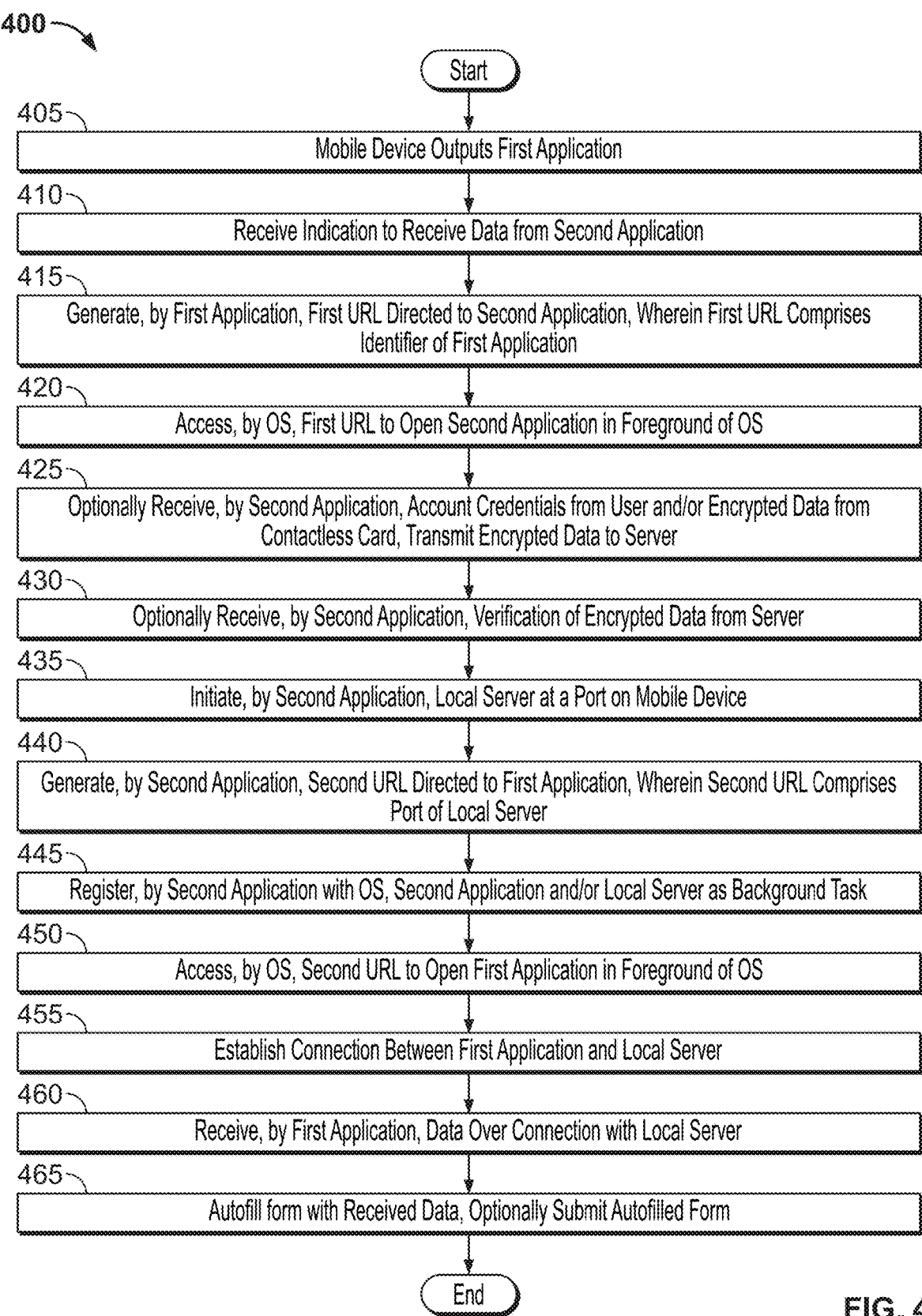
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to enable communication between applications in a mobile operating system. Embodiments are not limited in this context.

As shown, the logic flow 400 begins at block 405, where a device 110 outputs a first application in the foreground of an OS 112. For example, the first application may be the application 114-1, which may be a ride-sharing application. At block 410, the first application may receive an indication specifying to receive data from a second application. The second application may be the account application 113. For example, while attempting to order transportation services using the ride-sharing application, the user may specify to pull their payment data from the account application 113. At block 415, the first application generates a first URL directed to the second application. The first URL may include a unique identifier of the first application as a parameter.

At block 420, the OS 112 allows the first URL to be accessed, thereby opening the second application (e.g., the account application 113) in the foreground of the OS 112. At block 425, the second application may optionally receive authentication credentials for an account and/or encrypted data from a contactless card 201. For example, the user may provide biometric credentials and tap their contactless card 201 to the device 110, which causes the card 201 to generate and transmit encrypted data. At block 430, the second application receives verification of the encrypted data from the authentication server 220. At block 435, the second application creates a local server 115 on the mobile device 110 at a specified port.

At block 440, the second application generates a second URL. The second URL may be directed to the first application. A parameter of the second URL may comprise the port number of the local server 115. At block 445, the second application registers the local server 115 and/or the second application as a background task with the OS 112, thereby allowing the local server 115 and/or the second application to execute in the background of the OS 112 for some time. At block 450, the second URL is accessed to open the first application in the foreground of the OS 112, while the local server 115 and/or the second application continue to execute in the background of the OS 112.

At block 455, the first application establishes a connection with the local server 115. At block 460, the first application requests and receives data from the local server 115. At block 465, the first application processes the received data. For example, the data may be payment information from the account application 113, and the ride-sharing application 114 may autofill the payment information into a payment form. The user may then complete the request for transportation in the ride-sharing application using the autofilled payment information.

Figure 5:
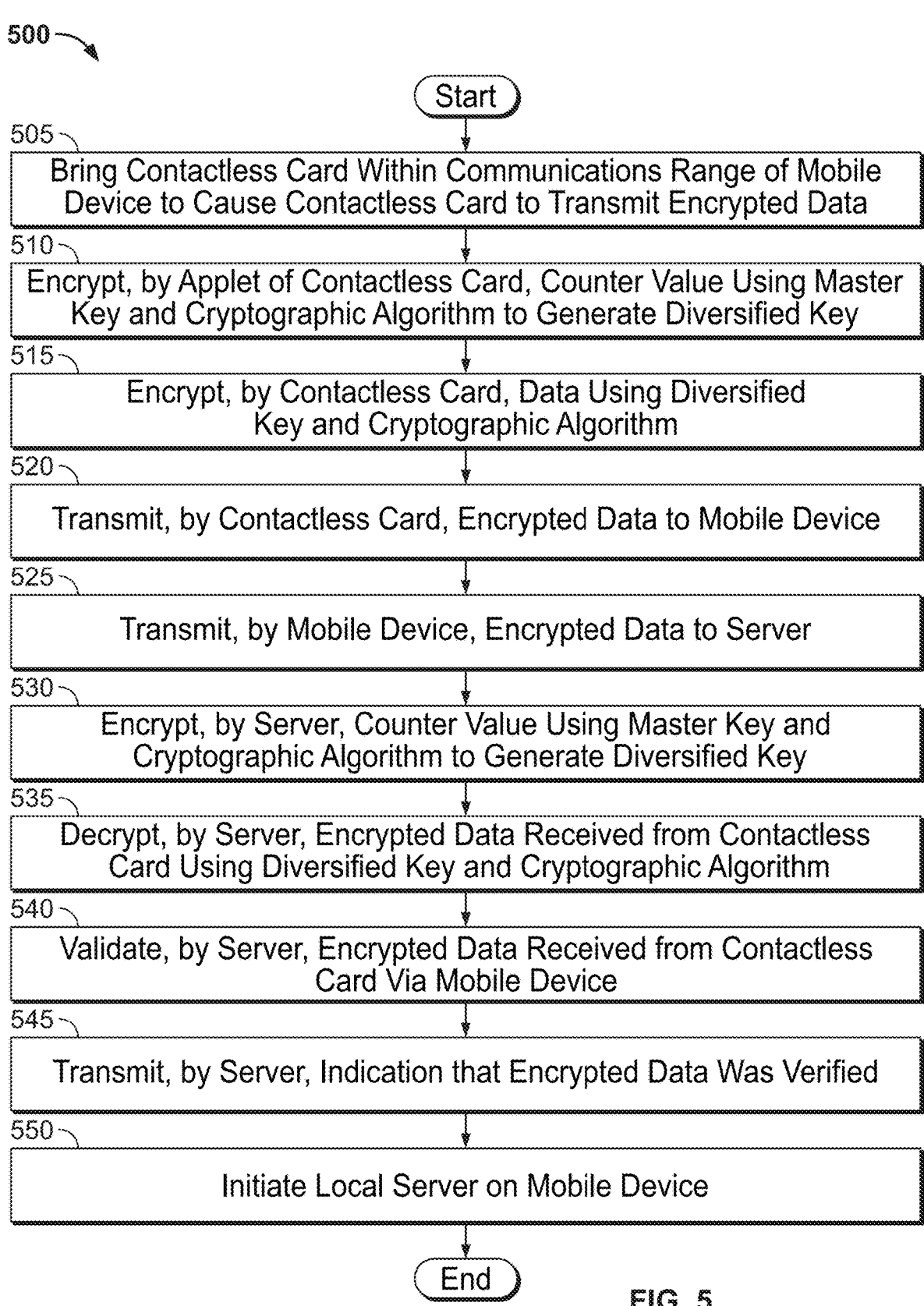
FIG. 5 illustrates an embodiment of a second logic flow

FIG. 5 illustrates an embodiment of a logic flow 500. The logic flow 500 may be representative of some or all of the operations executed by one or more embodiments described herein. For example, the logic flow 500 may include some or all of the operations to enable communication between applications in a mobile operating system based on verification of encrypted data generated by a contactless card 201. Embodiments are not limited in this context.

As shown, the logic flow 500 begins at block 505, where a user taps the contactless card 201 to the mobile device 110 to cause the contactless card 201 to generate and transmit encrypted data (e.g., the encrypted customer ID 208). At block 510, the applet 203 of the contactless card 201 generates the diversified key 206 by encrypting the counter value 204 and the master key 205 stored in the memory 202 of the contactless card. In some embodiments, the applet 203 may increment the counter 204 prior to the encryption. At block 515, the contactless card 201 encrypts data (e.g., the customer identifier 207) using the diversified key 206 and the cryptographic algorithm, generating encrypted data (e.g., the encrypted customer ID 208).

At block 520, the contactless card 201 may transmit the encrypted data to the account application 113 of the mobile device 110, e.g., using NFC. At block 525, the account application 113 of the mobile device 110 may transmit the data received from the contactless card 201 to the authentication application 223 of the server 220. At block 530, the authentication application 223 of the server 220 may generate a diversified key 206 using the master key 205 and the counter value 204 as input to a cryptographic algorithm. In one embodiment, the authentication application 223 increments the counter value 204 of the server 220 to synchronize with the counter value 204 in the memory of the contactless card 201.

At block 535, the authentication application 223 decrypts the encrypted customer ID 208 received from the contactless card 201 via the mobile device 110 using the diversified key 206. Doing so may yield at least the customer ID 207. By yielding the customer ID 207, the authentication application 223 may validate the data received from the contactless card 201 at block 540. For example, the authentication application 223 may compare the customer ID 207 to a customer identifier for the associated account in the account data 224, and validate the data based on a match. At block 545, the authentication application 223 may transmit an indication to the account application 113 specifying that the encrypted data was verified. At block 550, the account application 113 may initiate the local server 115 responsive to receiving the indication from the server at block 545.

Figure 6A:
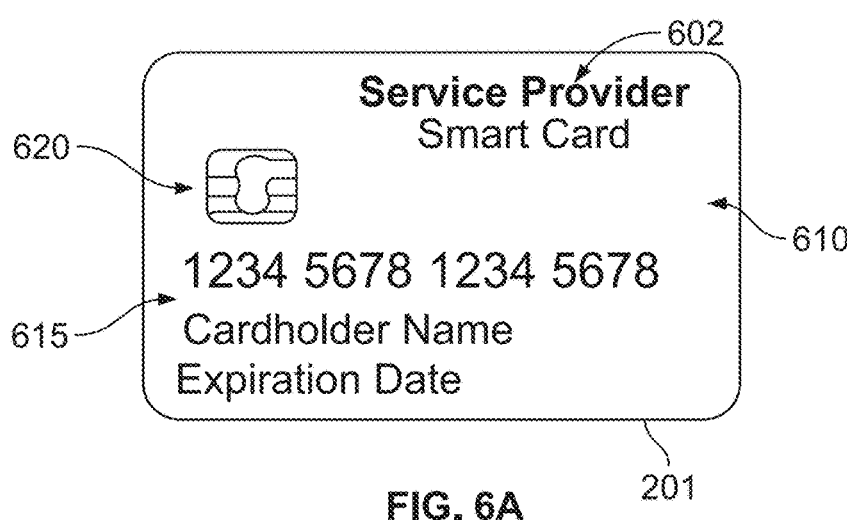
FIGS. 6A-6B illustrate an example contactless card.

FIG. 6A illustrates a contactless card 201, which may comprise a payment card, such as a credit card, debit card, and/or a gift card. As shown, the contactless card 201 may be issued by a service provider 602 displayed on the front or back of the card 201. In some examples, the contactless card 201 is not related to a payment card, and may comprise, without limitation, an identification card. In some examples, the payment card may comprise a dual interface contactless payment card. The contactless card 201 may comprise a substrate 610, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 201 may have physical characteristics compliant with the ID-1 format of the ISO/IEC 7810 standard, and the contactless card may otherwise be compliant with the ISO/IEC 14443 standard. However, it is understood that the contactless card 201 according to the present disclosure may have different characteristics, and the present disclosure does not require a contactless card to be implemented in a payment card.

The contactless card 201 may also include identification information 615 displayed on the front and/or back of the card, and a contact pad 620. The contact pad 620 may be configured to establish contact with another communication device, such as the mobile devices 110, a user device, smart phone, laptop, desktop, or tablet computer. The contactless card 201 may also include processing circuitry, antenna and other components not shown in FIG. 6A. These components may be located behind the contact pad 620 or elsewhere on the substrate 610. The contactless card 201 may also include a magnetic strip or tape, which may be located on the back of the card (not shown in FIG. 6A).

Figure 6B:
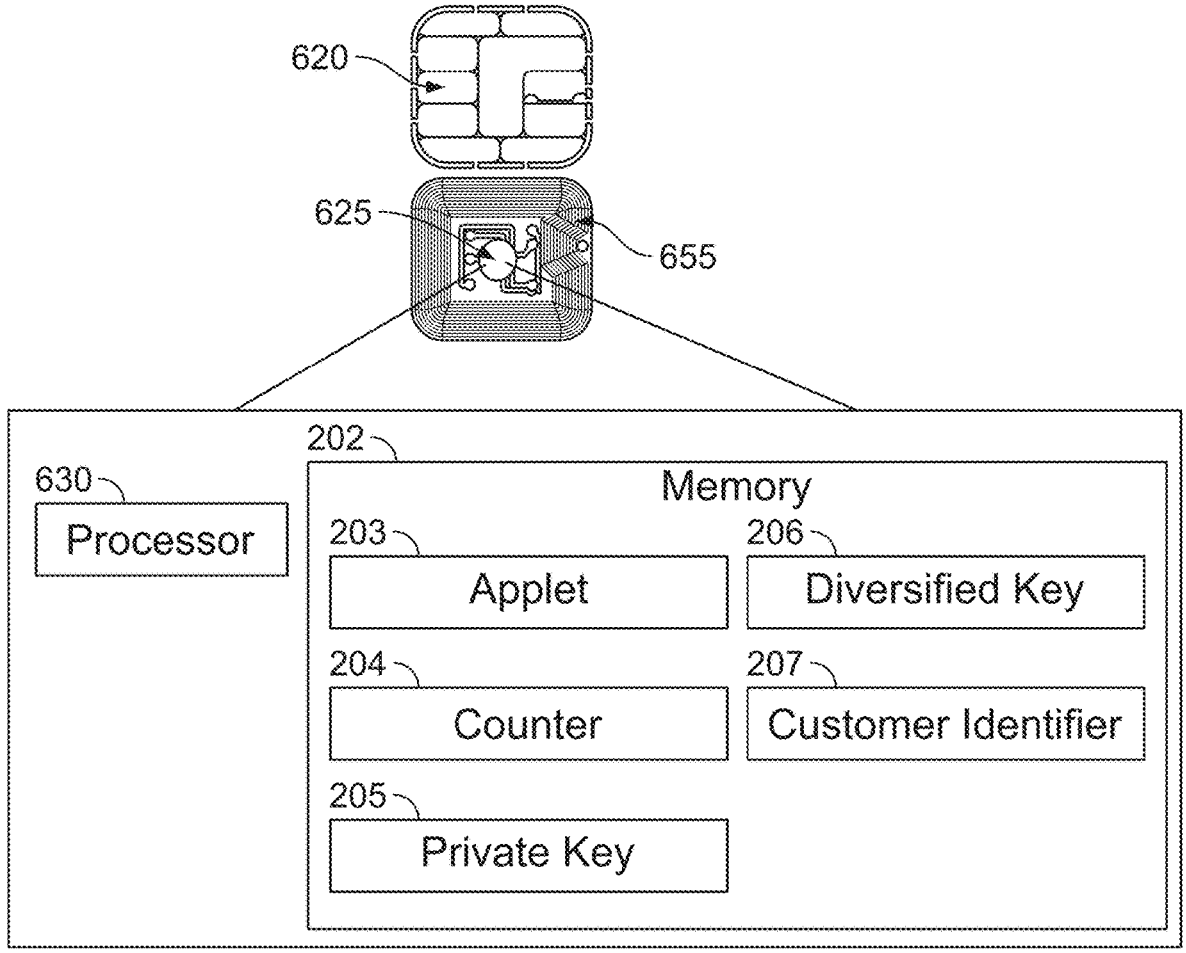

As illustrated in FIG. 6B, the contact pad 620 of contactless card 201 may include processing circuitry 625 for storing and processing information, including a microprocessor 630 and the memory 202. It is understood that the processing circuitry 625 may contain additional components, including processors, memories, error and parity/CRC checkers, data encoders, anti-collision algorithms, controllers, command decoders, security primitives and tamper proofing hardware, as necessary to perform the functions described herein.

The memory 202 may be a read-only memory, write-once read-multiple memory or read/write memory, e.g., RAM, ROM, and EEPROM, and the contactless card 201 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 202 may be configured to store one or more applets 203, the counter value 204, private key 205, the diversified key 206, and one or more customer IDs 207. The one or more applets 203 may comprise one or more software applications configured to execute on one or more contactless cards, such as a Java® Card applet. However, it is understood that applets 203 are not limited to Java Card applets, and instead may be any software application operable on contactless cards or other devices having limited memory. The customer ID 207 may comprise a unique alphanumeric identifier assigned to a user of the contactless card 201, and the identifier may distinguish the user of the contactless card from other contactless card users. In some examples, the customer ID 207 may identify both a customer and an account assigned to that customer and may further identify the contactless card associated with the customer's account. In some embodiments, the applet 203 may use the customer ID 207 as input to a cryptographic algorithm with the keys 205 and/or 206 to encrypt the customer ID 207. Similarly, the applet 203 may construct a URL that includes the encrypted customer ID 207 as a parameter.

The processor and memory elements of the foregoing exemplary embodiments are described with reference to the contact pad, but the present disclosure is not limited thereto. It is understood that these elements may be implemented outside of the pad 620 or entirely separate from it, or as further elements in addition to processor 630 and memory 202 elements located within the contact pad 620.

In some examples, the contactless card 201 may comprise one or more antennas 655. The one or more antennas 655 may be placed within the contactless card 201 and around the processing circuitry 625 of the contact pad 620. For example, the one or more antennas 655 may be integral with the processing circuitry 625 and the one or more antennas 655 may be used with an external booster coil. As another example, the one or more antennas 655 may be external to the contact pad 620 and the processing circuitry 625.

In an embodiment, the coil of contactless card 201 may act as the secondary of an air core transformer. The terminal may communicate with the contactless card 201 by cutting power or amplitude modulation. The contactless card 201 may infer the data transmitted from the terminal using the gaps in the contactless card's power connection, which may be functionally maintained through one or more capacitors. The contactless card 201 may communicate back by switching a load on the contactless card's coil or load modulation. Load modulation may be detected in the terminal's coil through interference. More generally, using the antennas 655, processing circuitry 625, and/or the memory 202, the contactless card 201 provides a communications interface to communicate via NFC, Bluetooth, and/or Wi-Fi communications.

As explained above, contactless cards 201 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the communications interface 218 of the device 110), and produce an NDEF message that comprises a cryptographically secure OTP (e.g., an encrypted customer ID) encoded as an NDEF text tag.

Figure 7:
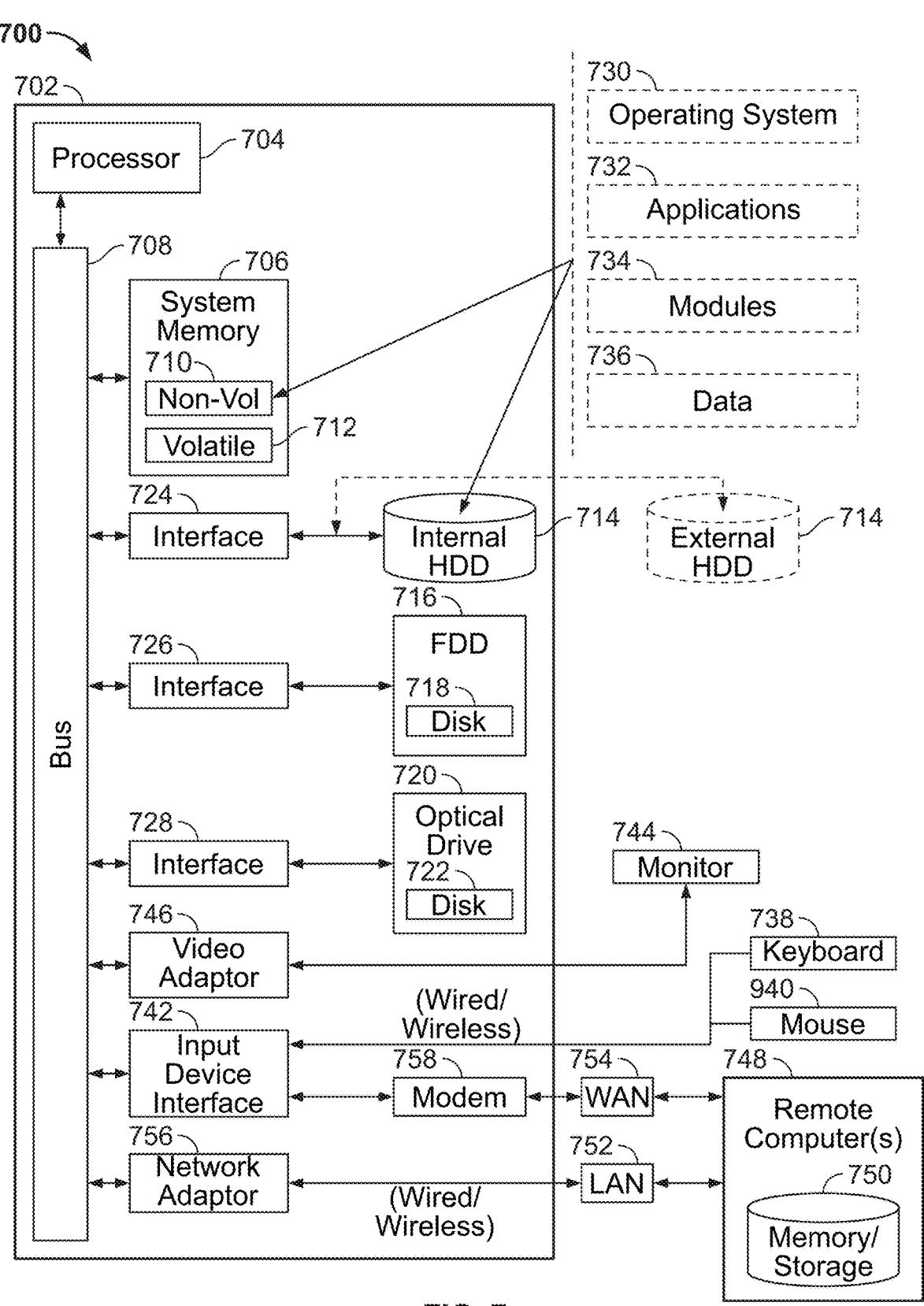
FIG. 7 illustrates an embodiment of a computing system.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the systems 100 and/or 200. In some embodiments, computing system 702 may be representative, for example, of the contactless card 201, mobile devices 110, and authentication server 220. The embodiments are not limited in this context. More generally, the computing architecture 700 is configured to implement all logic, applications, systems, methods, apparatuses, and functionality described herein with reference to FIGS. 1-6B.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections.

Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by an HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6B.

The drives and associated computer-readable media provide volatile and/or nonvolatile storage of data, data structures, computer-readable instructions, computer-executable instructions, and so forth. For example, a number of program modules can be stored in the drives and memory units 710, 712, including an operating system 730, one or more application programs 732, other program modules 734, and program data 736. In one embodiment, the one or more application programs 2032, other program modules 734, and program data 736 can include, for example, the various applications and/or components of the systems 100, 200, e.g., the applet 203, counter 204, private key 205, diversified key 206, customer ID 207, operating system 112, account application 113, other applications 114, the authentication application 223, the account data 224, and/or the encrypted customer ID 208.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 230 of FIG. 2 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:
confirming, by a first application using an operating system (OS) executing on a processor, that a second application to which a first link generated by the first application is directed is installed on the OS by validating at least a portion of the first link, wherein the at least a portion of the first link is validated using an application programming interface (API) of the OS prior to the OS opening the second application;
opening, by the OS executing on the processor based on the first link, the second application on the processor;
generating, by the second application, a second link directed to the first application, wherein the second link comprises an encrypted parameter;
opening, by the OS based on the second link generated by the second application, the first application; and
receiving, by the first application, data from the second application by decrypting the encrypted parameter included in the second link.

2. The method of claim 1, further comprising:
validating, by the second application using the API of the OS prior to the OS opening the first application, at least a portion of the second link.

3. The method of claim 1, wherein a parameter of the first link comprises a token, further comprising:

receiving a request to establish a connection from the first application, wherein the request comprises the token; and
validating the token.

4. The method of claim 1, wherein the first link and the second link comprise universal link uniform resource locators (URLs) directed to the first and second applications, respectively.

5. The method of claim 1, further comprising generating, by the second application, a notification to tap a contactless card on a user interface associated with the OS.

6. The method of claim 1, further comprising:
registering, by the second application using an application programming interface of the OS, the second application as a background task to execute in a background of the OS; and
executing, by the OS, the second application in the background of the OS.

7. The method of claim 1, further comprising:
generating, by the first application, the first link, wherein a parameter of the first link comprises an identifier of the first application; and
generating, by the second application, the second link based at least in part on the identifier of the first application.

8. The method of claim 1, further comprising prior to the second application generating the second link:
receiving, by the second application, encrypted data from a contactless card;
transmitting, by the second application, the encrypted data to a server; and
receiving, by the second application, an indication from the server specifying the server decrypted the encrypted data, wherein the second application initiates the server based at least in part on the indication received from the server.

9. A non-transitory computer-readable storage medium, the computer-readable storage medium including instructions that when executed by a processor, cause the processor to:
confirm, by a first application using operating system (OS), that a second application to which a first link generated by the first application is directed is installed on the OS by validating at least a portion of the first link, wherein the at least a portion of the first link is validated using an application programming interface (API) of the OS prior to the OS opening the second application;
open, by the OS based on the first link, the second application;
generate, by the second application, a second link directed to the first application, wherein the second link comprises an encrypted parameter;
open, by the OS based on the second link generated by the second application, the first application; and
receive, by the first application, data from the second application by decrypting the encrypted parameter included in the second link.

10. The computer-readable storage medium of claim 9, wherein the instructions further cause the processor to:
validate, by the second application using the API of the OS prior to the OS opening the first application, at least a portion of the second link.

11. The computer-readable storage medium of claim 9, wherein a parameter of the first link comprises a token, wherein the instructions further cause the processor to:

receive a request to establish a connection from the first application, wherein the request comprises the token; and validate the token.

12. The computer-readable storage medium of claim 9, wherein the first link and the second link comprise universal link uniform resource locators (URLs) directed to the first and second applications, respectively.

13. The computer-readable storage medium of claim 9, wherein the instructions further cause the processor to:

register, by the second application using an application programming interface of the OS, the second application as a background task to execute in a background of the OS; and execute, by the OS, the second application in the background of the OS.

14. The computer-readable storage medium of claim 9, wherein the instructions further cause the processor to:

generate, by the first application, the first link, wherein a parameter of the first link comprises an identifier of the first application; and generate, by the second application, the second link based at least in part on the identifier of the first application.

15. A computing apparatus comprising:

a processor; and a memory storing instructions that, when executed by the processor, cause the processor to:

confirm, by a first application using an operating system (OS), that a second application to which a first link generated by the first application is directed is installed on the OS by validating at least a portion of the first link using an application programming interface (API) of the OS prior to the OS opening the second application;

open, by the OS based on the first link, a second application;

generate, by the second application, a second link directed to the first application, wherein the second link comprises an encrypted parameter;

open, by the OS based on the second link generated by the second application, the first application; and receive, by the first application, data from the second application by decrypting the encrypted parameter included in the second link.

16. The computing apparatus of claim 15, wherein the instructions further cause the processor to:

validate, by the second application using the API of the OS prior to the OS opening the first application, at least a portion of the second link.

17. The computing apparatus of claim 15, wherein a parameter of the first link comprises a token, wherein the instructions further cause the processor to:

receive a request to establish a connection from the first application, wherein the request comprises the token; and validate the token.

18. The computing apparatus of claim 15, wherein the first link and the second link comprise universal link uniform resource locators (URLs) directed to the first and second applications, respectively.

19. The computing apparatus of claim 15, wherein the instructions further cause the processor to:

register, by the second application using an application programming interface of the OS, the second application as a background task to execute in a background of the OS; and execute, by the OS, the second application in the background of the OS.

20. The computing apparatus of claim 15, wherein the instructions further cause the processor to:

generate, by the first application, the first link, wherein a parameter of the first link comprises an identifier of the first application; and generate, by the second application, the second link based at least in part on the identifier of the first application.

* * * * *